H. B. MILLER.
BROILER.
APPLICATION FILED AUG. 27, 1910.
1,006,254.
Patented Oct. 17, 1911.
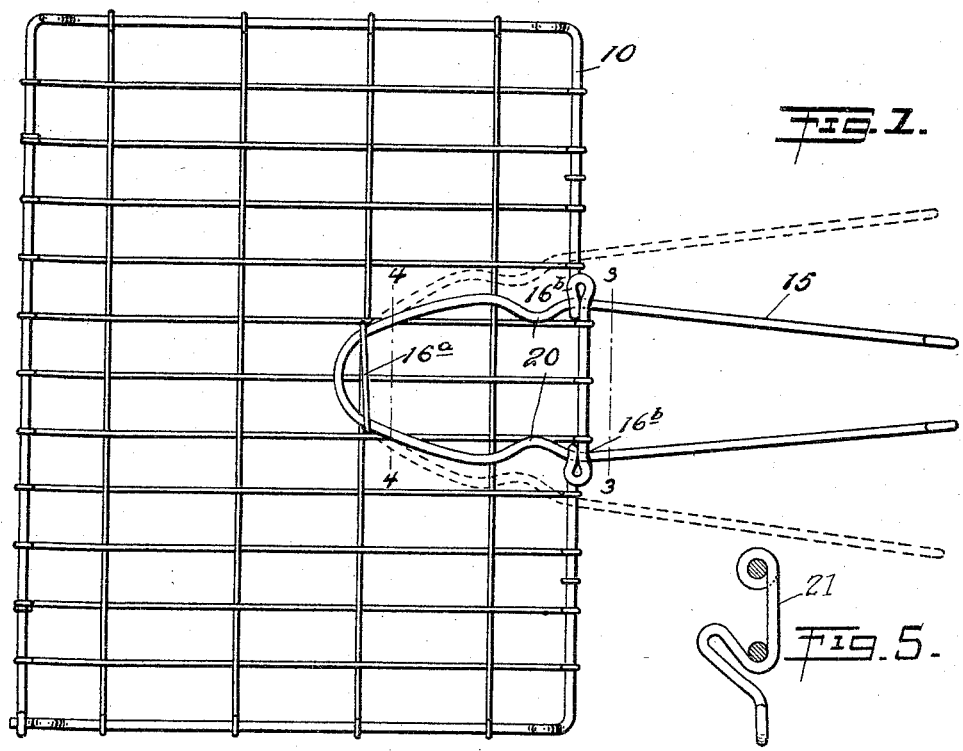
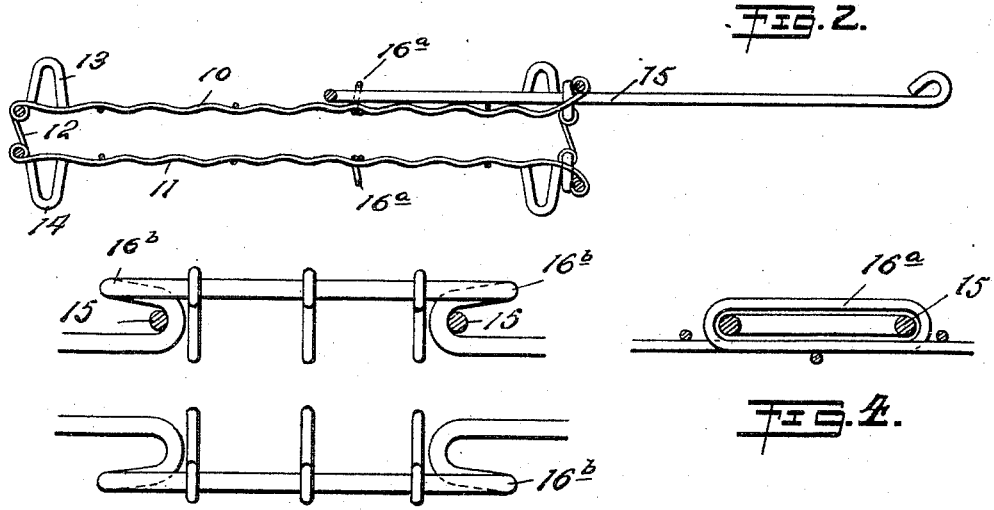
Witnesses:
G. Robert Thomas
W. F. Fagan
Inventor
Horace B. Miller
By his Attorney

UNITED STATES PATENT OFFICE.

HORACE B. MILLER, OF NEW YORK, N. Y.

BROILER.

1,006,254. Specification of Letters Patent. Patented Oct. 17, 1911.

Application filed August 27, 1910. Serial No. 579,349.

*To all whom it may concern:*

Be it known that I, HORACE B. MILLER, a citizen of the United States, residing in the city, county, and State of New York, have invented certain new and useful Improvements in Broilers, of which the following is a specification.

This invention relates to broilers designed for use more particularly in broiling ovens, such as the broiling ovens of gas ranges. The customary form of broiler for such purposes is merely a grid standing in a drip pan beneath the burners. This form of broiler is attended with considerable inconvenience in the particular of turning the meat or other thing being cooked. The turning must be performed by lifting the meat with a fork or turner and depositing it on the grid with its other side up. When a number of small pieces of meat, such as chops, are being broiled, the operation of turning them individually requires some little time and causes considerable loss of heat since the door of the broiler oven must be kept open. The turning of fish upon such a broiler entails considerable difficulty owing to the danger of breaking the fish.

The object of the present invention is to provide a broiler for broiler ovens in which such difficulties and objections are obviated, and which is adapted for use in broiler ovens of gas ranges as now constructed, without requiring any alteration in the oven or its door or in the drip pan.

To this end the invention consists in a double leaf broiler, between the leaves of which the meat is held, having a readily attachable and detachable handle for lifting and turning the broiler, the removability of the handle enabling the oven door to be closed and the handle to keep cool.

Various features of the invention will become apparent as the specification proceeds and will be pointed out more particularly in the appended claims.

In the accompanying drawings illustrating the invention by means of the preferred embodiment thereof: Figure 1 is a plan view of the broiler, the handle being shown in full lines in the position occupied when it is compressed in the hand, dotted lines being used to show the open position to which the handle springs when relieved of lateral pressure; Fig. 2 is a vertical longitudinal section; Fig. 3 is a section on the line 3—3 of Fig. 1; Fig. 4 is a section on the line 4—4 of Fig. 1; and Fig. 5 is a detail view showing a suitable embodiment of means for holding the hinged grids closed.

In these views, the numerals 10 and 11 designate the two leaves of the broiler, which may be of similar construction and may be formed in any suitable fashion. The construction shown, in which the leaves are grids of crimped wire, is suitable for the purpose. The two leaves are preferably united by hinge connections 12 of any suitable form, at their rear edges. Both leaves are preferably provided with oppositely extending legs 13 and 14, which enable the broiler to stand in the drip pan with either side up. These legs may be formed by bending the wire of the leaves at the margins thereof, in loops or otherwise, in directions substantially perpendicular to the planes of the leaves. In order to keep the leaves from separating when the broiler is turned, I provide suitable means for holding the leaves together, such as catches 21 at the front edges of the leaves.

The numeral 15 designates a readily attachable and detachable handle for the broiler constructed in accordance with the invention. Both leaves of the broiler are provided with handle attaching means, so that the handle may be attached to either grid that happens to be uppermost, and also in accordance with the invention the handle attaching means on the grids are so constructed and arranged that the handle finds spaced forward and rearward bearings, so that a secure connection is insured. This latter is important, because with a heavy piece of meat in the broiler the grids would tend to sag downward from the handle if the connection were localized at one region. The handle overlies either of the grids and engages the forward and rearward bearings simultaneously. In the best form of the invention the handle is spring-self-releasing, whereby difficulty in removing the handle from the under side of the broiler after turning is minimized. The form of the handle and the attaching means on the broiler thus constructed in accordance with my invention may be widely varied, but the preferred constructions are those shown herein. In this particular construction, the handle is bent from a single piece of spring wire into general V-shape, the two side members being preferably provided with lateral offsets or bends 20. The rear ends of the side members of the handle are united together, and this united portion is adapted to be inserted beneath either of the transverse keepers or elongated eyes 16ª, constituting one form of rear socket. These sockets 16ª project outward from the plane of the grid which carries them and may be formed by bending one of the wires of the grid. The rear united portion of the handle is of such width that only a portion of the bend projects through the socket 16ª, the handle thus bearing rearward against the socket. The side members of the handle are adapted to be compressed by the grasp of the hand against and beneath laterally-spaced lugs or projections 16ᵇ which they embrace. In this position, the offsets 20 take behind the lugs 16ᵇ and prevent the handle from slipping forward. In its normal form the handle takes over these lugs 16ᵇ readily, after first being inserted beneath the socket 16ª, and the act of compressing the side members of the handle together by the grasp of the hand firmly clamps the handle to the broiler for the purpose of turning it. After the turning has been effected, relaxation of the pressure on the handle enables the side members thereof to spring outward, thus disengaging themselves from the lugs 16ᵇ, when the handle may be readily removed from the under side of the broiler to permit the oven door to be closed. The provision of the supporting legs 13 and 14 is most important in connection with the removal of the handle from the under side of the broiler, since they afford a free space for the purpose. The attaching portions 16ª and 16ᵇ are materially spaced from each other to prevent the weight of the meat from dragging the broiler down when lifted. Of course, the broiler may be used as a toaster if desired.

Having thus described my invention, what I claim as new and desire to secure by Letters Patent, is:

1. A broiler for use beneath the burners of a gas broiler oven, comprising two grids hinged together at their rear edges and each having on its outer side spaced complementary handle-receiving sockets, said sockets being located, respectively, adjacent the forward edge of the grid and considerably in rear thereof, a readily attachable and detachable handle having means for engaging the complementary sockets of either grid to lift and turn the broiler, and means for holding the grids closed during such operation.

2. A broiler comprising two grids hinged together, a readily attachable and detachable spring handle having two spaced, compressible side members, means on each grid for engaging said handle, said means including members lying between the side members of the handle, said side members being spring tensioned so as to spring outward from said members but compressible by the grasp of the hand into firm engagement therewith.

3. A broiler comprising two grids hinged together and each having handle-attaching means projecting from the plane thereof, and a spring-self-releasing handle comprising two side members united at their rear ends, said handle-attaching means including members embraced by said side members and a part engaging the rear united portion of the handle when the latter is attached, said side members of the handle being normally spaced apart at a distance to release said members of the handle-attaching means but compressible into firm engagement therewith.

4. A broiler comprising two grids hinged together and having handle attaching means consisting of a rear socket and forward laterally-spaced projections, and a spring-self-releasing handle consisiting of two side members united together at their rear ends, said side members being adapted to embrace and be compressed beneath said projections and the united rear portion being adapted to be received in said rear socket for lifting and turning the broiler.

5. A broiler comprising two grids hinged together and having handle attaching means consisting of a rear socket and forward laterally-spaced projections, and a spring-self-releasing handle consisting of two side members united together at their rear ends, the united rear portion of the handle being adapted to enter beneath and bear rearward against said socket and said side members being adapted to embrace and be compressed beneath said projections, said side members having lateral offsets adapted to take behind said projections to prevent the handle from slipping forward while compressed.

In testimony whereof I have hereunto set my hand, this 20th day of August 1910, in the city, county and State of New York, in the presence of two subscribing witnesses.

HORACE B. MILLER.

Witnesses:
B. W. COULDOCK,
J. F. BRANDENBURG.

---

Copies of this patent may be obtained for five cents each, by addressing the "Commissioner of Patents, Washington, D. C."